(12) United States Patent
Eguchi

(10) Patent No.: US 8,169,720 B2
(45) Date of Patent: May 1, 2012

(54) REAR FOCUS WIDE-ANGLE LENS SYSTEM AND ELECTRONIC IMAGING DEVICE USING THE SAME

(75) Inventor: Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/609,236

(22) Filed: Oct. 30, 2009

(65) Prior Publication Data
US 2010/0110561 A1      May 6, 2010

(30) Foreign Application Priority Data

Nov. 4, 2008   (JP) ................................. 2008-283355
Jul. 29, 2009   (JP) ................................. 2009-176553

(51) Int. Cl.
*G02B 9/04*   (2006.01)
*G02B 9/60*   (2006.01)
(52) U.S. Cl. ........................................ 359/793; 359/770
(58) Field of Classification Search .................. 359/684, 359/793–795, 770
See application file for complete search history.

(56) References Cited

U.S. PATENT DOCUMENTS

| | | | |
|---|---|---|---|
| 5,946,136 A * | 8/1999 | Suzuki | ........................... 359/557 |
| 6,833,967 B2 | 12/2004 | Sekita | |
| 6,865,031 B2 | 3/2005 | Hoshi | |
| 8,027,100 B2 * | 9/2011 | Take | ............................. 359/794 |
| 2004/0223230 A1 | 11/2004 | Saori | |
| 2005/0237627 A1 | 10/2005 | Hirakawa | |
| 2006/0126192 A1 | 6/2006 | Ryu et al. | |
| 2008/0106809 A1 | 5/2008 | Hirano | |
| 2008/0252993 A1 | 10/2008 | Eguchi | |
| 2009/0244724 A1 * | 10/2009 | Shibata | ......................... 359/792 |

FOREIGN PATENT DOCUMENTS

| | | |
|---|---|---|
| JP | 2003-241084 | 8/2003 |
| JP | 3723654 | 9/2005 |
| JP | 3943988 | 4/2007 |

OTHER PUBLICATIONS

English language Abstract of JP 2003-241084, Aug. 27, 2003.
English language Abstract of JP 10-213742, Aug. 11, 1998.
English language Abstract of JP 2003-329925, Nov. 19, 2003.

* cited by examiner

*Primary Examiner* — William Choi
(74) *Attorney, Agent, or Firm* — Greenblum & Bernstein, P.L.C.

(57) ABSTRACT

A rear focus wide-angle lens system includes a first lens group, a diaphragm, and a second lens group, in this order from the object. The second lens group is moved along the optical axis of the lens system when focusing is performed from infinity to an object at a closer distance. The rear focus wide-angle lens system satisfies the condition $1.5 < F1/F2 < 3.0$, wherein F1 designates the focal length of the first lens group and F2 designates the focal length of the second lens group.

20 Claims, 12 Drawing Sheets

FNo.=1:2.8

—— d Line
------- g Line
- - - - C Line

-0.2    0.2

SPHERICAL
ABERRATION

CHROMATIC
ABERRATION

W=37.2

-0.01    0.01

LATERAL
CHROMATIC
ABERRATION

W=37.2

—— S
- - M

-0.2    0.2

ASTIGMATISM

W=37.2

-3    3  %

DISTORTION

Fe=1:2.9 d Line
g Line
C Line

-0.2  0.2
SPHERICAL
ABERRATION
CHROMATIC
ABERRATION

Y=10.80

-0.01  0.01
LATERAL
CHROMATIC
ABERRATION

Y=10.80

— S
-- M

-0.2  0.2
ASTIGMATISM

Y=10.80

-3  3 %
DISTORTION

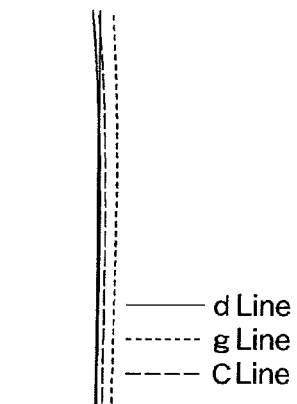
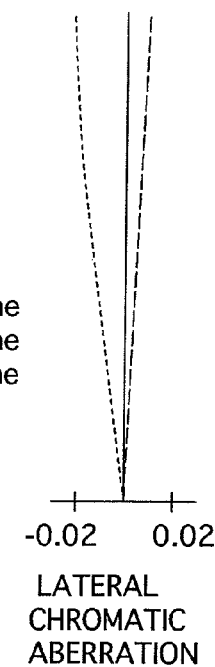
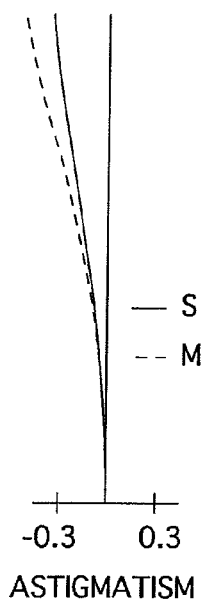
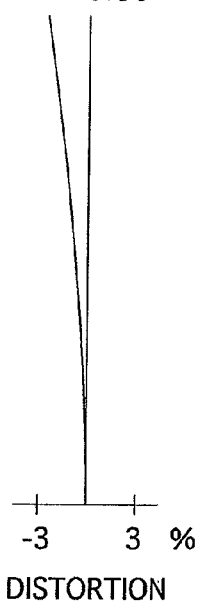
Fig. 6A  Fe=1:2.9  SPHERICAL ABERRATION  CHROMATIC ABERRATION
Fig. 6B  Y=10.80  LATERAL CHROMATIC ABERRATION
Fig. 6C  Y=10.80  ASTIGMATISM
Fig. 6D  Y=10.80  DISTORTION Fig. 7
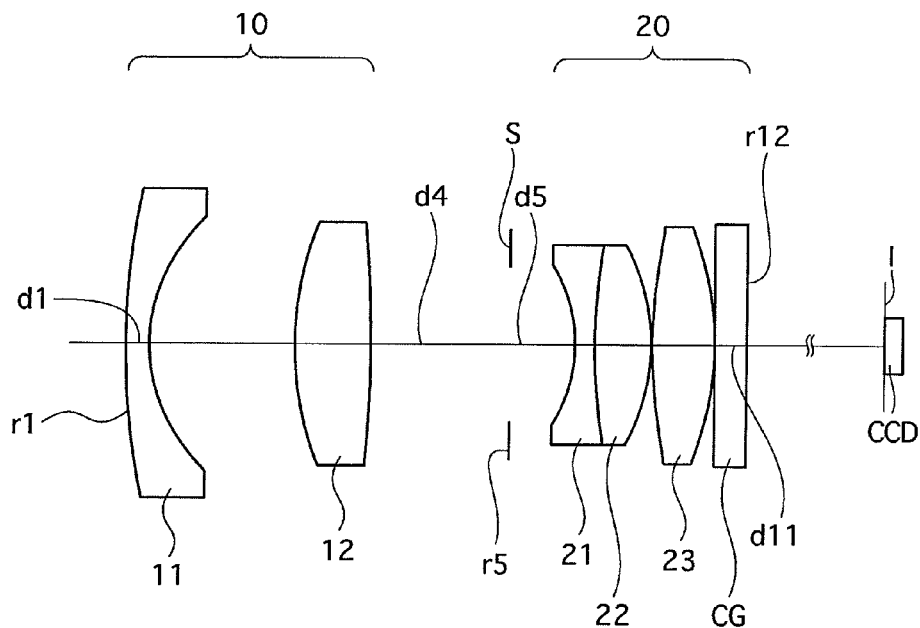
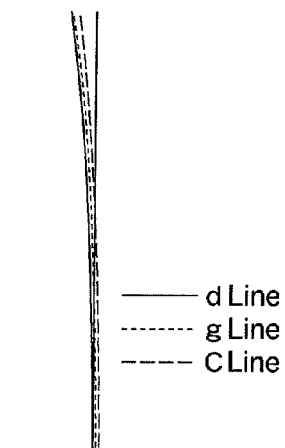
Fig. 8A
FNo.=1:2.0
—— d Line
------ g Line
---- C Line
-0.2   0.2
SPHERICAL
ABERRATION
CHROMATIC
ABERRATION
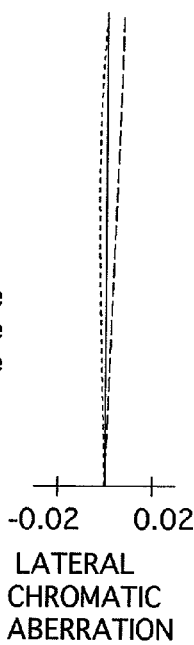
Fig. 8B
W=31.9
-0.02   0.02
LATERAL
CHROMATIC
ABERRATION
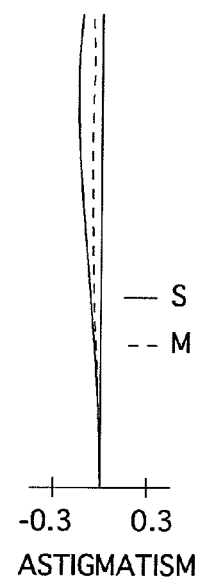
Fig. 8C
W=31.9
—— S
-- M
-0.3   0.3
ASTIGMATISM
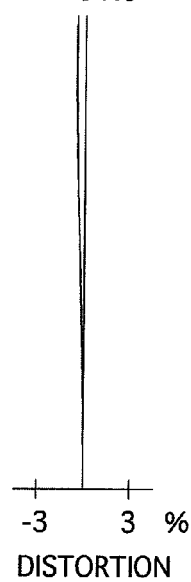
Fig. 8D
W=31.9
-3   3 %
DISTORTION Fe=1:2.1

— d Line
------ g Line
---- C Line

-0.2    0.2
SPHERICAL
ABERRATION
CHROMATIC
ABERRATION

Y=10.80

-0.02   0.02
LATERAL
CHROMATIC
ABERRATION

Y=10.80

— S
-- M

-0.3    0.3
ASTIGMATISM

Y=10.80

-3    3   %
DISTORTION

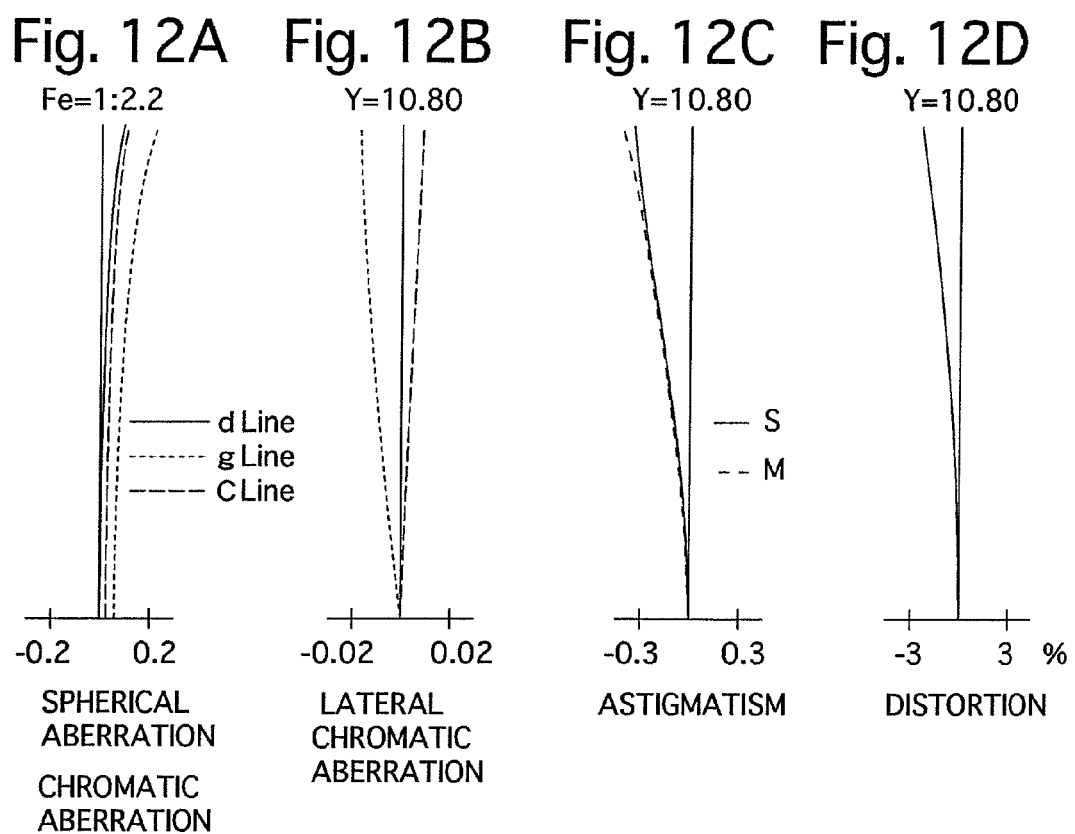

Fig. 13
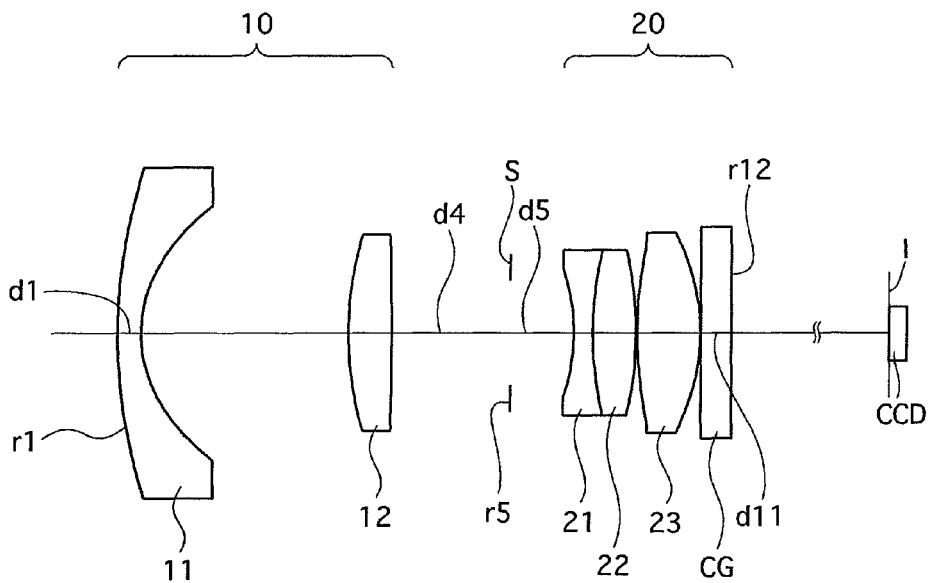
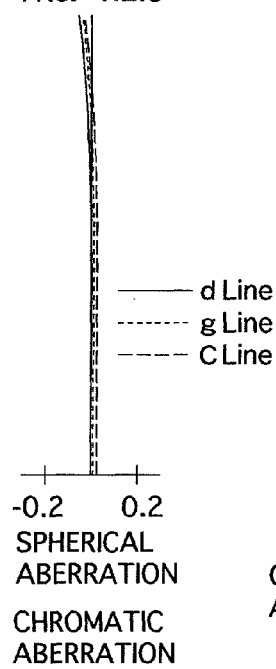
Fig. 14A
FNo.=1:2.8
— d Line
------- g Line
---- C Line
-0.2    0.2
SPHERICAL
ABERRATION
CHROMATIC
ABERRATION
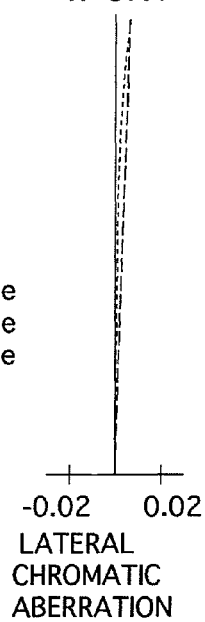
Fig. 14B
W=37.4
-0.02    0.02
LATERAL
CHROMATIC
ABERRATION
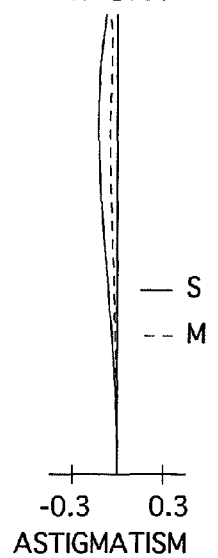
Fig. 14C
W=37.4
— S
-- M
-0.3    0.3
ASTIGMATISM
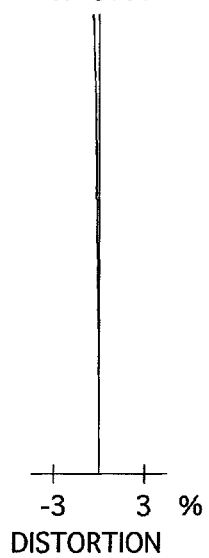
Fig. 14D
W=37.4
-3    3  %
DISTORTION

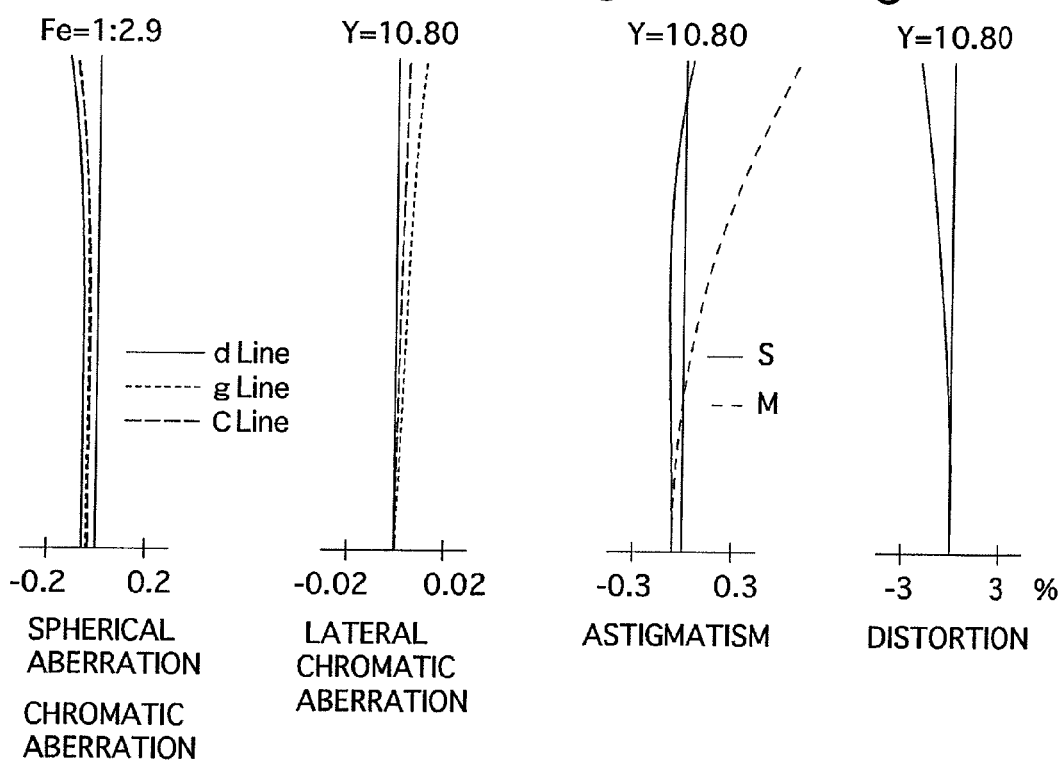

Fig. 16
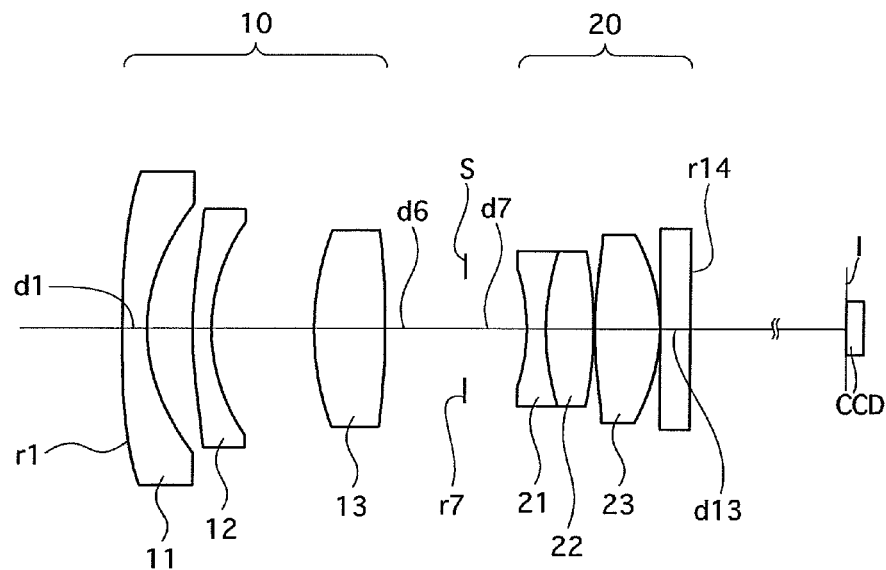
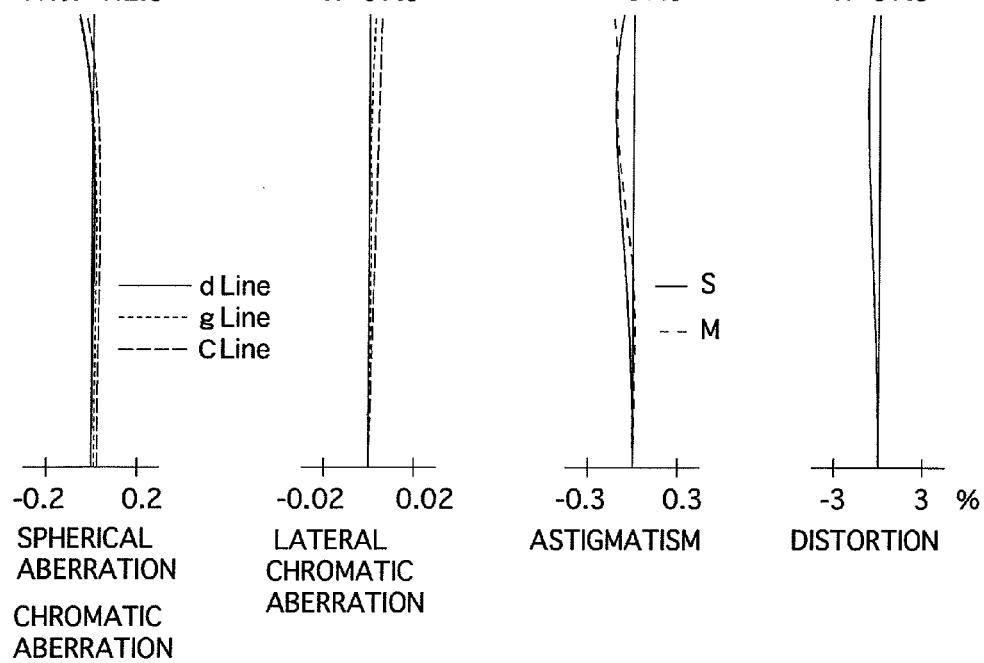
Fig. 17A
FNo.=1:2.8
Fig. 17B
W=37.3
Fig. 17C
W=37.3
Fig. 17D
W=37.3
—— d Line
------ g Line
---- C Line
—— S
-- M
-0.2    0.2
SPHERICAL
ABERRATION
CHROMATIC
ABERRATION
-0.02   0.02
LATERAL
CHROMATIC
ABERRATION
-0.3    0.3
ASTIGMATISM
-3    3  %
DISTORTION

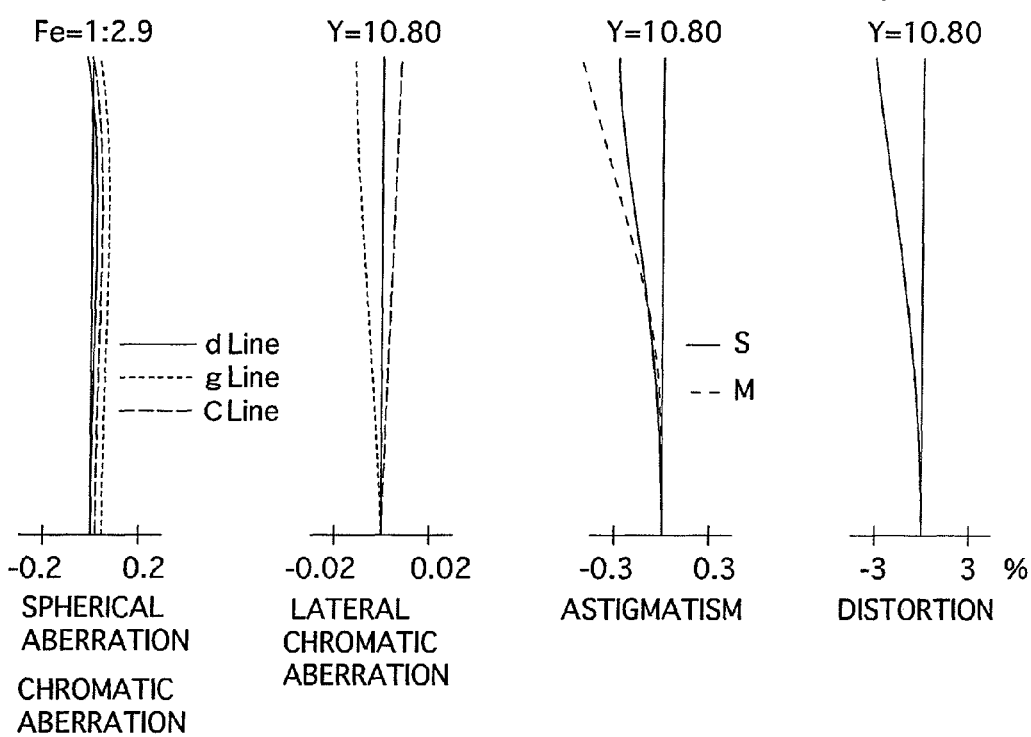

REAR FOCUS WIDE-ANGLE LENS SYSTEM AND ELECTRONIC IMAGING DEVICE USING THE SAME

BACKGROUND OF THE INVENTION

1. Field of the Invention

The present invention relates to a rear focus wide-angle lens system having a half angle-of-view exceeding 30°, which is used in a small, light-weight digital camera, etc. The present invention also relates to an electronic imaging device using such a rear focus wide-angle lens system.

2. Description of Related Art

In recent years digital cameras and digital video cameras which employ a solid-state imaging sensor (image sensor) such as a CCD, etc., have become commonplace, and such cameras are also being utilized in mobile phones and PDAs (personal digital assistants), etc. In order to attain higher picture quality, the size of the image sensor is unavoidably increased. However, if the size of the image sensor is increased, the size of the photographic optical system designed for such an image sensor also has to be increased, and it becomes difficult to correct aberrations occurred in the photographic optical system. Furthermore, the pixel size of an image sensor is ever decreasing, and higher definition has been progressed. Consequently, a higher optical quality is required for the photographic optical system.

On the other hand, in an optical system utilizing such an image sensor, a long back focal distance is required due to the need to accommodate a filter group between the optical system and the image sensor. Moreover, telecentricity, in which light rays exiting from the optical system are incident onto the image sensor at right-angles thereto (perpendicular thereto), is also required. Hence, if an attempt is made to satisfy the above-mentioned conditions, the optical system tends to become larger. Therefore miniaturization of the optical system is an important factor, even in the case of a single focal-point lens system which has a relatively greater potential for miniaturization thereof.

Furthermore, a single focal-point lens system has often employed an entire lens-system advancing mechanism for focusing. However, a light-weight focusing lens group is required due to the use of smaller motors for driving the focusing lens group and due to increased focusing speed. Therefore a mechanically simple and convenient system in which a portion of the lens system is moved upon focusing is desired.

Various retrofocus optical systems having five lens elements, i.e., a lens element having a negative refractive power (hereinafter, a negative lens element), a lens element having a positive refractive power (hereinafter, a positive lens element), a negative lens element, a positive lens element and another positive lens element, in this order from the object, have been proposed, as examples of wide-angle lens systems which are telecentric and have a simple structure (e.g., Japanese Patent Nos. 3,943,988 and 3,723,654, and Japanese Unexamined Patent Publication No. 2003-241084).

However, in the optical system taught in Japanese Patent No. 3,943,988, an F-number is only 3.9, which is slow (dark), and a half angle-of-view is 24° through 32°, which is not sufficient for wide-angle use, and, field curvature and astigmatism are relatively large with respect to the focal length. These features are not enough to attain higher resolution.

In Japanese Patent No. 3,723,654, the half angle-of-view is only 25°, which is insufficient for a wide-angle lens system.

In Japanese Unexamined Patent Publication No. 2003-241084, a front lens group is provided on the object side of a diaphragm and a rear lens group is provided on the image side of the diaphragm, and focusing is carried out by the rear lens group. However, no provision is taught for preventing aberration fluctuations when focusing is carried out for an object at a closer distance; and, the angle-of-view is narrow, and astigmatism largely occurs.

In a fast wide-angle lens system, coma and astigmatism tend to largely occur, so that it is difficult for a conventional wide-angle lens system to attain an increased size and higher density of the image sensor. Furthermore, there are only a few conventional wide-angle lens systems that are designed with consideration to optical quality when focusing at a closer distance and to reduction in weight of the focusing lens group.

SUMMARY OF THE INVENTION

The present invention provides a fast wide-angle lens system which has a half angle-of-view exceeding 30°, achieves superior optical quality when focusing is carried out for an object at closer distance, and has high resolution. Further, the fast wide-angle lens system reduces the weight of the focusing lens group.

According to an aspect of the present invention, there is provided a rear focus wide-angle lens system including a first lens group, a diaphragm, and a second lens group, in this order from the object.

The second lens group is moved along the optical axis thereof when focusing is performed from infinity to an object at a closer distance.

The rear focus wide-angle lens system satisfies the following condition:

$$1.5 < F1/F2 < 3.0 \quad (1)$$

wherein

F1 designates the focal length of the first lens group; and
F2 designates the focal length of the second lens group.

The rear focus wide-angle lens system preferably satisfies the following condition:

$$0.35 < D2/D1 < 0.7 \quad (2)$$

wherein

D1 designates the distance along the optical axis from the most object-side surface of the first lens group to the most image-side surface thereof; and
D2 designates the distance along the optical axis from the most object-side surface of the second lens group to the most image-side surface thereof.

The first lens group preferably includes a first lens element having a negative refractive power (hereinafter, a negative first lens element) and a second lens element having a positive refractive power (hereafter, a positive second lens element), in this order from the object.

The first lens group satisfies the following condition:

$$-1.5 < f2/f1 < -1.1 \quad (3)$$

wherein f1 designates the focal length of the negative first lens element; and
f2 designates the focal length of the positive second lens element.

Alternatively, the first lens group preferably includes a negative first lens element and a negative second lens element, in this order from the object.

The first lens group satisfies the following condition:

$$-1.5 < d1/f1 < -0.4 \quad (4)$$

wherein d1 designates the distance along the optical axis from the image-side surface of the negative first lens element to the object-side surface of the positive second lens element; and f1 designates the focal length of the negative first lens element.

The rear focus wide-angle lens system preferably satisfies the following condition:

$$N1>1.65 \qquad (5)$$

wherein

N1 designates the refractive index of the d-line of the most object-side lens element in the first lens group.

More specifically, the negative first lens element can be formed as a meniscus lens element having the convex surface facing toward the object; and, at least the image-side surface of the meniscus lens element is provided with an aspherical surface on which the refractive power becomes weaker toward the periphery of the meniscus lens element, compared to the refractive power of the paraxial spherical surface.

The positive second lens element can be formed as a biconvex positive lens element.

According to another aspect of the present invention, there is provided a rear focus wide-angle lens system including a first lens group having a positive refractive power (hereinafter, a positive first lens group), a diaphragm, and a second lens group having a positive refractive power (hereinafter, a positive second lens group), in this order from the object.

The positive first lens group includes a negative first lens element constituted by a negative meniscus lens element having the convex surface facing toward the object, and a positive second lens element constituted by a biconvex positive lens element, in this order from the object. At least the image-side surface of the negative meniscus lens element is provided with an aspherical surface on which the refractive power becomes weaker toward the periphery of the meniscus lens element, compared to the refractive power of the paraxial spherical surface.

The positive second lens group includes a cemented lens having a biconcave negative third lens element and a biconvex positive fourth lens element, and a biconvex positive fifth lens element, in this order from the object. Both surfaces of the biconvex positive fifth lens element are provided with an aspherical surface on which the refractive power becomes weaker toward the periphery of the biconvex positive fifth lens element, compared to the refractive power of the paraxial spherical surface.

Focusing from infinity to an object at a closer distance is carried out by moving the positive second lens group along the optical axis toward the object.

The rear focus wide-angle lens system according to another aspect of the present invention preferably satisfies the following condition:

$$1.5<F1/F2<3.0 \qquad (1)$$

wherein

F1 designates the focal length of the positive first lens group; and

F2 designates the focal length of the positive second lens group.

The rear focus wide-angle lens system according to another aspect of the present invention preferably satisfies the following condition:

$$vL>70 \qquad (6)$$

wherein vL designates the Abbe number of the d-line of the most image-side lens element of the rear focus wide-angle lens system.

In an embodiment, an electronic imaging device is provided, including the above described rear focus wide-angle lens system.

According to the present invention, a rear focus wide-angle lens system which can attain at least the following features is provided:

a half angle-of-view exceeding 30°;

superior optical quality when focusing is carried out for an object at closer distance;

high resolution; and

Light-weight focusing lens group.

The present disclosure relates to subject matter contained in Japanese Patent Application Nos. 2008-283355 (filed on Nov. 4, 2008) and 2009-176553 (filed on Jul. 29, 2009 which are expressly incorporated herein in its entirety.

BRIEF DESCRIPTION OF THE DRAWINGS

The present invention will be discussed below in detail with reference to the accompanying drawings, in which:

FIGS. 6A, 6B, 6C and 6D show aberrations of the lens arrangement shown in FIG. 4 when an object at the closest distance is in an in-focus state;

FIG. 7 shows a lens arrangement of a third embodiment of a rear focus wide-angle lens system according to the present invention;

FIGS. 8A, 8B, 8C and 8D show aberrations of the lens arrangement shown in FIG. 7 when an object at infinity is in an in-focus state;

FIGS. 12A, 12B, 12C and 12D show aberrations of the lens arrangement shown in FIG. 10 when an object at the closest distance is in an in-focus state;

FIG. 13 shows a lens arrangement of a fifth embodiment of a rear focus wide-angle lens system according to the present invention;

FIGS. 14A, 14B, 14C and 14D show aberrations of the lens arrangement shown in FIG. 13 when an object at infinity is in an in-focus state;

FIGS. 15A, 15B, 15C and 15D show aberrations of the lens arrangement shown in FIG. 13 when an object at the closest distance is in an in-focus state;

FIG. 16 shows a lens arrangement of a sixth embodiment of a rear focus wide-angle lens system according to the present invention;

FIGS. 17A, 17B, 17C and 17D show aberrations of the lens arrangement shown in FIG. 16 when an object at infinity is in an in-focus state;

FIGS. 18A, 18B, 18C and 18D show aberrations of the lens arrangement shown in FIG. 16 when an object at the closest distance is in an in-focus state;

DESCRIPTION OF THE PREFERRED EMBODIMENTS

Figure 1:
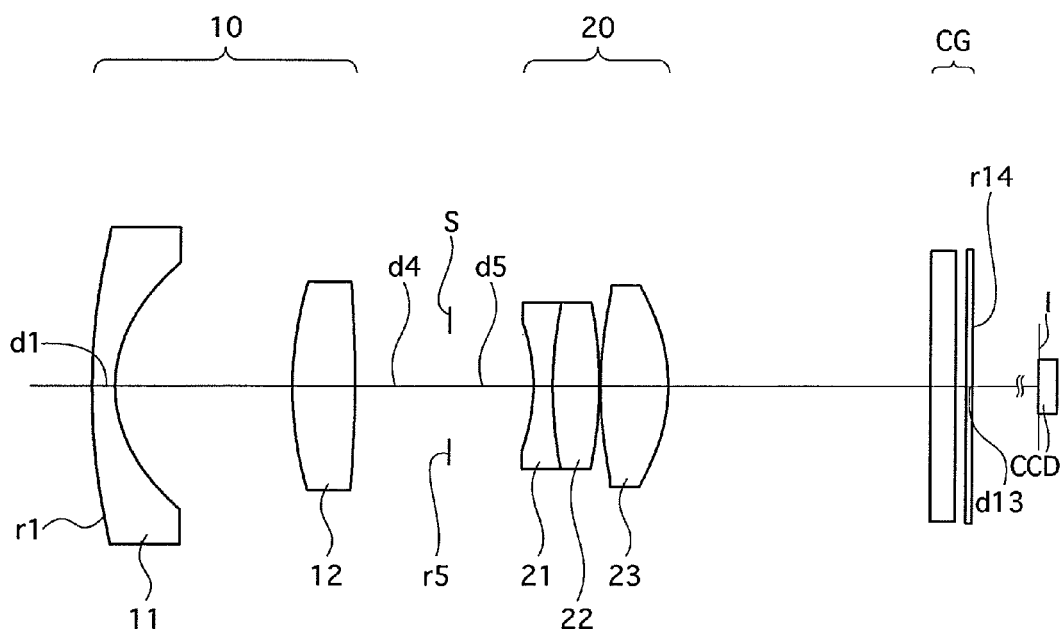
FIG. 1 shows a lens arrangement of a first embodiment of a rear focus wide-angle lens system according to the present invention.
Figure 2A:
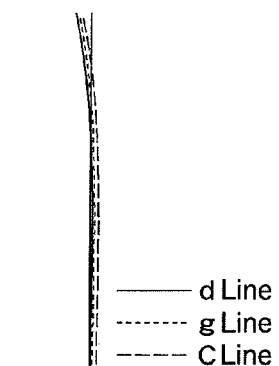
FIGS. 2A, 2B, 2C and 2D show aberrations of the lens arrangement shown in FIG. 1 when an object at infinity is in an in-focus state.
Figure 2B:
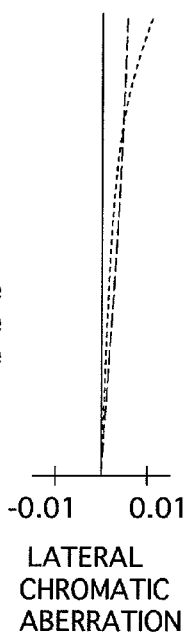
Figure 2C:
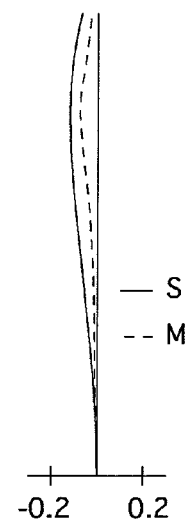
Figure 2D:
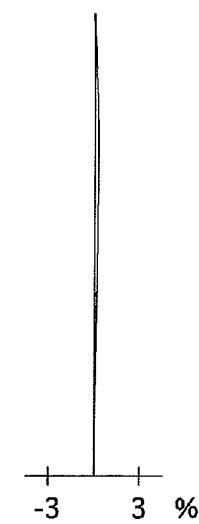
Figure 3A:
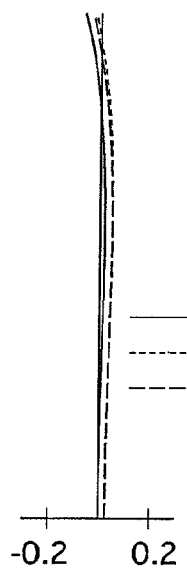
FIGS. 3A, 3B, 3C and 3D show aberrations of the lens arrangement shown in FIG. 1 when an object at the closest distance is in an in-focus state.
Figure 3B:
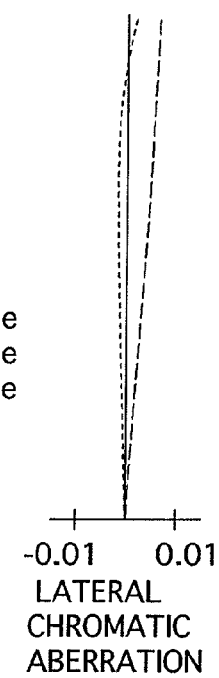
Figure 3C:
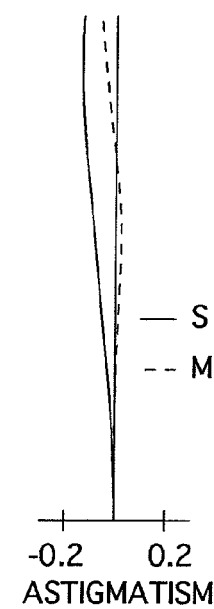
Figure 3D:
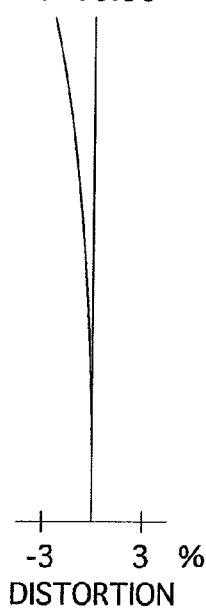

As shown in the embodiments of FIGS. 1, 4, 7, 10, 13 and 16, the rear focus wide-angle lens system according to the present invention includes a positive first lens group 10, a diaphragm S, and a positive second lens group 20, in this order from the object. CG designates a cover glass (filter group) which is provided in front of an image sensor. 'I' designates the imaging plane where the light-receiving surface of a CCD (an electronic imaging device) is positioned.

Focusing from infinity to an object at a closer distance is carried out by moving the positive second lens group 20 toward the object.

In each of the first through fifth embodiments shown in FIGS. 1, 4, 7, 10, and 13, the positive first lens group 10 includes a negative first lens element 11 which is a meniscus lens element having the convex surface facing toward the object, and a biconvex positive second lens element 12, in this order from the object.

In the sixth embodiment shown in FIG. 16, the positive first lens group 10 includes a negative first lens element 11 which is a meniscus lens element having the convex surface facing toward the object, a negative second lens element 12 which is a meniscus lens element having the convex surface facing toward the object, and a biconvex positive third lens element 13, in this order from the object.

According to the lens arrangement of the sixth embodiment shown in FIG. 16, a first lens element, which is provided with a strong negative refractive power for the purpose of attaining a larger angle-of-view, is divided into the two negative lens elements, i.e., the negative first lens element 11 and the negative second lens element 12, so that the off-axis light rays are gradually deflected, and the occurrence of aberrations is reduced.

The positive second lens group 20 has the same arrangement for each of the first through sixth embodiments, and includes a cemented lens having a biconcave negative third lens element (fourth lens element in the sixth embodiment shown in FIG. 16) 21 and a biconvex positive fourth lens element (fifth lens element) 22, and a positive fifth lens element (sixth lens element) 23, in this order from the object.

In the first embodiment of FIG. 1, the cover glass CG is formed from two glass plates which are stationary with respect to the imaging plane, and are provided immediately in front of the image sensor.

In the remaining second through sixth embodiments, the cover glass CG is formed from a single glass plate which is provided immediately behind the positive second lens group 20, and integrally moves with the positive second lens group 20. The cover glass CG constituted by the single glass plate includes a plane-parallel plate which is optically equivalent at any position between the positive second lens group 20 and the imaging plane I.

In each embodiment, the negative first lens element 11 (the most object-side lens element in the positive first lens group 10) is provided with an aspherical surface, on at least the image-side surface, on which the refractive power becomes weaker toward the periphery of the negative first lens element 11, compared to the refractive power of the paraxial spherical surface; and, the positive fifth lens element (sixth lens element) 23 (the most image-side lens element in the positive second lens group 20) is provided with an aspherical surface, on both surfaces, on which the refractive power becomes weaker toward the periphery of the positive fifth lens element (sixth lens element) 23, compared to the refractive power of the paraxial spherical surface In the negative first lens element 11, the aspherical surface can at least be provided on the image-side surface thereof where the off-axis light rays are sharply deflected and cause aberrations to occur; and, the object-side surface thereof can be formed as a spherical surface.

Condition (1) is provided for eliminating fluctuations of aberrations at close-distances, and for correcting aberrations suitably even when the lens system is further miniaturized.

If F1/F2 exceeds the lower limit of condition (1), the back focal distance becomes longer than required, and the overall length of the lens system becomes longer. If F1/F2 exceeds the upper limit of condition (1), the overall length of the lens system can easily be reduced. However, aberrations become larger when focusing is performed on an object at a closer distance, so that deterioration of the optical quality becomes noticeable.

Condition (2) concerns the weight reduction of the focusing lens group (the positive second lens group 20).

If the thickness of the positive second lens group 20 decreases to the extent that D2/D1 exceeds the lower limit of condition (2), the weight of the focusing lens group can be reduced; however, the correcting of lateral chromatic aberration becomes difficult. In other words, by achieving a thickness of the positive second lens group 20 which is greater than the lower limit of condition (2), the off-axis light rays emitted from the positive second lens group 20 is sufficiently distant from the optical axis, and can be made parallel therewith, so that telecentricity is secured.

If the thickness of the positive second lens group 20 increases to the extent that D2/D1 exceeds the upper limit of condition (2), it is advantageous for the correcting of aberrations and securing telecentricity; however, weight reduction of the focusing lens group (the positive second lens group 20) cannot be undesirably achieved.

By providing a retrofocus lens arrangement in which the first lens element 11 having the strong negative refractive power is positioned at the most object-side of the positive first lens group 10 and a lens element having a positive refractive power, such as the second lens element 12, is arranged thereafter, a wider angle-of-view and telecentricity can be attained. On the other hand, distortion, coma and astigmatism are difficult to be corrected due to attaining wider angle-of-view. These aberrations can be reduced by providing the most object-side lens element (the negative first lens element 11) with the aspherical surfaces on which the refractive power becomes weaker toward the periphery of the negative first lens element 11, compared to the refractive power of the paraxial spherical surface, and by providing the most image-side lens element (the positive fifth lens element (sixth lens element) 23) with the aspherical surfaces on which the refractive power becomes weaker toward the periphery of the positive fifth lens element (sixth lens element) 23, compared to the refractive power of the paraxial spherical surface Condition (3) is provided for attaining a wider angle-of-view when the positive first lens group 10 includes the negative first lens element 11 and the positive second lens element 12, in this order from the object.

If f2/f1 exceeds the upper limit of condition (3), the focal length of the negative first lens element 11 becomes too long with respect to that of the positive second lens element 12. Consequently, it becomes difficult to attain an angle-of-view exceeding 30°.

If f2/f1 exceeds the lower limit of condition (3), the back focal distance becomes too long. If an attempt is made to strengthen the refractive power of the positive second lens group 20 to make the back focal distance shorter, fluctuations of aberrations at close-distances undesirably become larger when focusing is performed by the positive second lens group 20.

Condition (4) is provided for sufficiently securing peripheral illumination and suitably correcting off-axis aberrations, such as distortion, coma and astigmatism, when the positive first lens group 10 includes the negative first lens element 11 and the positive second lens element 12, in this order from the object.

If d1/f1 exceeds the upper limit of condition (4), i.e., if the distance between the negative first lens element 11 and the positive second lens element 12 (the distance along the optical axis from the object-side surface of the negative first lens element 11 to the image-side surface of the positive second lens element 12) is short with respect to the focal length of the negative first lens element 11, the amount of peripheral illumination cannot be increased by increasing aberrations at the entrance pupil of the off-axis light rays.

If d1/f1 exceeds the lower limit of condition (4), it is advantageous for collecting peripheral illumination. However, the height of the axial light rays which are incident onto the positive second lens group 20 increases, so that the overall length of the lens system increases. In such a case, if an attempt is made to strengthen the refractive power of the positive second lens group 20 in order to shorten the overall length of the lens system, the correcting of field curvature and astigmatism becomes difficult.

Condition (5) is provided for attaining a wider angle-of-view and reducing the manufacturing costs.

In order to attain a wider angle-of-view, it is necessary to make the refractive power of the negative first lens element 11 stronger. However, if a glass material having a low refractive index which does not satisfy condition (5) is used to form the negative first lens element 11, the radius of curvature thereof becomes too small, so that large amounts of off-axis aberrations, such as astigmatism, etc., occur, which makes the correcting of such aberrations difficult. Furthermore, the difficulty in producing the aspherical surfaces on the negative first lens element 11 increases, and the production costs thereof become higher.

Condition (6) is provided for suitably correcting axial chromatic aberration and lateral chromatic aberration.

If the Abbe number of the most image-side lens element (i.e., the rearmost lens element 23 of the positive second lens group 20) becomes large to the extent that vL exceeds the lower limit of condition (6), chromatic aberration occurring at the rearmost lens element 23 of the positive second lens group 20 has to be corrected by the cemented lens (21 and 22) provided on the object side of the rearmost lens element 23. However, the radius of curvature of the bonding surface of the cemented lens has to be reduced in order to suitably increase the amount of the correcting of aberrations, which in turn causes an undesirable increase in size of the positive second lens group 20 which constitutes a focusing lens group.

Furthermore, in order to suitably correct color shift of the g-line, and to perform the correcting of chromatic aberration, it is desirable to use a glass material satisfying condition (6'), i.e., selecting an anomalous dispersion glass material:

$$vL > 80 \qquad (6').$$

Specific numerical data of the embodiments will be described hereinafter.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, y designates the image height, the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the diagrams of distortion, y designates the image height.

In the tables, FNO. designates the F-number, Fe designates the effective F-number, f designates the focal length of the entire lens system, m designates the lateral magnification, W designates the half angle-of-view (°), y designates the image height, fB designates the back focal distance (the distance between the image-side surface of the most image-side cover glass to the imaging plane), L designates the length of the lens system, r designates the radius of curvature, d designates the lens-element thickness or a distance between lens elements (lens groups), $N_d$ designates the refractive index of the d-line, and v designates the Abbe number.

FNO., Fe, f, m, W, y, fB, L and d (which changes according to focusing) are shown in the following order: "an object at infinity being in an in-focus state" and "an object at the closest distance being in an in-focus state".

In addition to the above, an aspherical surface which is symmetrical with respect to the optical axis is defined as follows:

$$x = cy^2/(1+[1-\{1+K\}c^2y^2]_{1/2}) + A4y^4 + A6y^6 + A8y^8 + A10y^{10} \ldots$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIG. 1 shows the lens arrangement of the first embodiment of a rear focus wide-angle lens system according to the present invention. FIGS. 2A through 2D show aberrations of the lens arrangement shown in FIG. 1 when an object at infinity is in an in-focus state. FIGS. 3A through 3D show aberrations of the lens arrangement shown in FIG. 1 when an object at the closest distance (0.1 m) is in an in-focus state.

Table 1 shows the numerical data of the first embodiment.

The rear focus wide-angle lens system of the first embodiment includes a positive first lens group 10, a diaphragm S, and a positive second lens group 20, in this order from the object.

The positive first lens group 10 includes a negative first lens element 11 formed as a meniscus lens element having the convex surface facing toward the object, and a biconvex positive second lens element 12, in this order from the object.

The positive second lens group 20 includes a cemented lens having a biconcave negative third lens element 21 and a biconvex positive fourth lens element 22, and a positive fifth lens element 23, in this order from the object.

The negative first lens element 11 (the most object-side lens element in the positive first lens group 10) is provided, on the object-side surface thereof, with an aspherical surface on which the refractive power becomes stronger toward the periphery of the negative first lens element 11, compared to the refractive power of the paraxial spherical surface, and on the image-side surface thereof, with an aspherical surface on which the refractive power becomes weaker toward the periphery of the negative first lens element 11, compared to the refractive power of the paraxial spherical surface.

The most image-side lens element in the positive second lens group 20 (i.e., the positive fifth lens element 23) is provided, on each side thereof, with an aspherical surface on which the refractive power becomes weaker toward the periphery of the positive fifth lens element 23, compared to the refractive power of the paraxial spherical surface.

The basic lens arrangement of the second embodiment is the same as that of the first embodiment except that the cover glass CG includes one glass plate, is disposed immediately behind (on the image side of) the positive second lens group 20, and moves integrally with the positive second lens group 20 upon focusing.

However, in the actual use, the cover glass and filter group for the image sensor are fixed in the vicinity of the image sensor.

TABLE 2

|        | ∞           | 0.1 m       |
|--------|-------------|-------------|
| FNO. = | 2.8–2.9 (Fe)|             |
| f =    | 17.80–17.22 |             |
| m =    | 0.000–−0.165|             |
| W =    | 31.2–31.0   |             |
| y =    | 10.80–10.80 |             |
| fB =   | 22.91–25.99 |             |
| L =    | 63.74–63.74 |             |

TABLE 1

|        | ∞           | 0.1 m       |
|--------|-------------|-------------|
| FNO. = | 2.8–2.9 (Fe)|             |
| f =    | 14.24–14.01 |             |
| m =    | 0.000–−0.129|             |
| W =    | 37.2–37.0   |             |
| y =    | 10.80–10.80 |             |
| fB =   | 0.10–0.10   |             |
| L =    | 69.74–69.74 |             |
| D5 =   | 6.597–4.698 |             |
| D10 =  | 20.595–22.494|            |

| Surf. No.    | r        | d      | Nd      | ν    |
|--------------|----------|--------|---------|------|
| 1*           | 56.461   | 1.800  | 1.69350 | 53.3 |
| 2*           | 10.312   | 13.930 |         |      |
| 3            | 28.238   | 4.950  | 1.88300 | 40.8 |
| 4            | −100.246 | 7.368  |         |      |
| 5 (Diaphragm)| ∞        | D5     |         |      |
| 6            | −14.730  | 1.500  | 1.71736 | 29.5 |
| 7            | 32.457   | 3.650  | 1.72916 | 54.7 |
| 8            | −32.457  | 0.100  |         |      |
| 9*           | 29.375   | 5.300  | 1.49700 | 81.6 |
| 10*          | −13.494  | D10    |         |      |
| 11           | ∞        | 1.950  | 1.51680 | 64.2 |
| 12           | ∞        | 0.800  |         |      |
| 13           | ∞        | 0.500  | 1.51680 | 64.2 |
| 14           | ∞        | —      |         |      |

Aspherical surface data (the aspherical surface coefficients not indicated are zero (0.00)):

| Surf. No. | K      | A4                    | A6                     | A8                    | A10                    |
|-----------|--------|-----------------------|------------------------|-----------------------|------------------------|
| 1         | 0.0    | $0.2476 \times 10^{-4}$  | $-0.2036 \times 10^{-6}$ | $0.3424 \times 10^{-9}$  | $0.4970 \times 10^{-12}$  |
| 2         | −0.250 | $-0.1420 \times 10^{-4}$ | $-0.4501 \times 10^{-7}$ | $-0.5898 \times 10^{-8}$ |                        |
| 9         | 0.0    | $-0.6116 \times 10^{-4}$ | $0.2004 \times 10^{-6}$  | $0.1078 \times 10^{-8}$  | $-0.4946 \times 10^{-11}$ |
| 10        | 0.0    | $0.6755 \times 10^{-4}$  | $0.6377 \times 10^{-8}$  | $0.2166 \times 10^{-8}$  | $0.5787 \times 10^{-11}$  |

The symbol * designates the aspherical surface which is rotationally symmetrical with respect to the optical axis.

[Embodiment ]2

Figure 4:
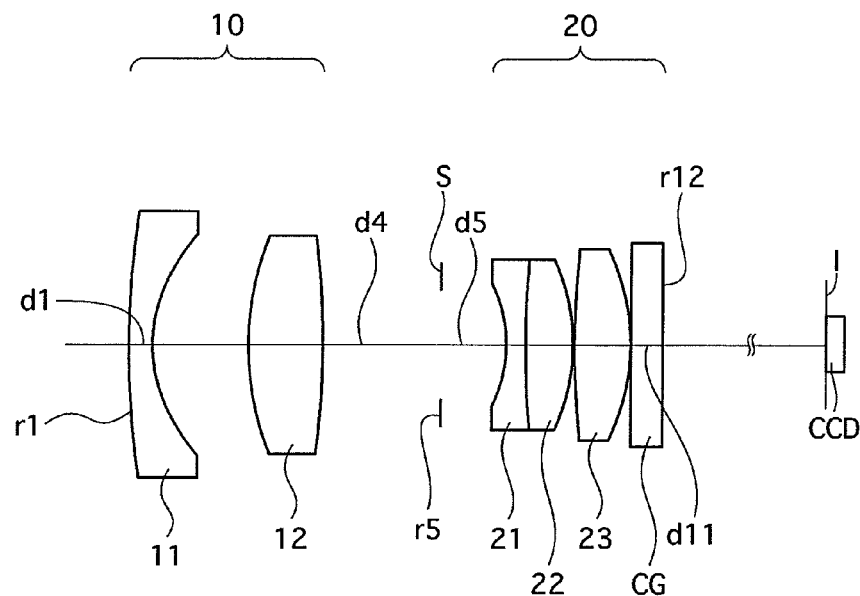
FIG. 4 shows a lens arrangement of a second embodiment of a rear focus wide-angle lens system according to the present invention.
Figure 5A:
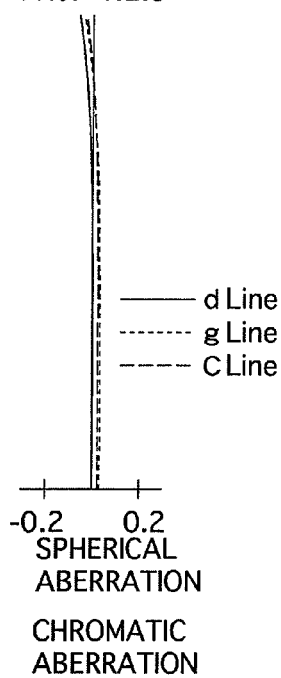
FIGS. 5A, 5B, 5C and 5D show aberrations of the lens arrangement shown in FIG. 4 when an object at infinity is in an in-focus state.
Figure 5B:
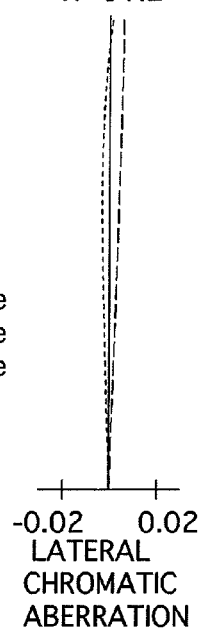
Figure 5C:
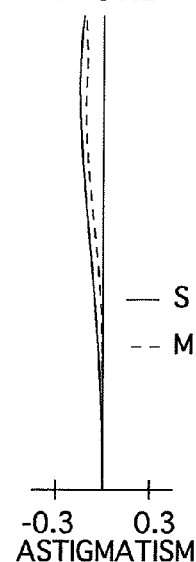
Figure 5D:
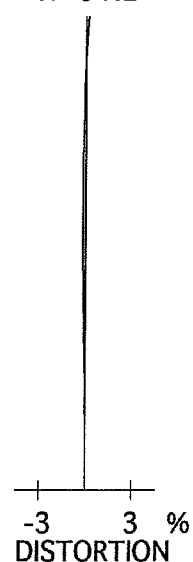
Figure 9A:
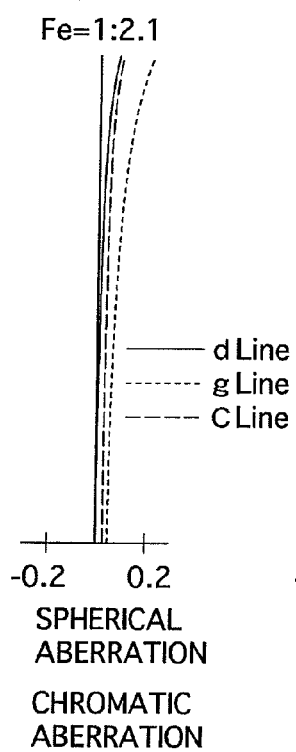
FIGS. 9A, 9B, 9C and 9D show aberrations of the lens arrangement shown in FIG. 7 when an object at the closest distance is in an in-focus state.
Figure 9B:
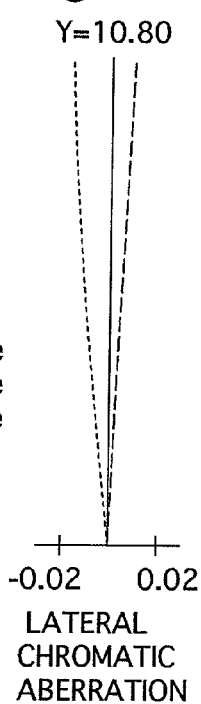
Figure 9C:
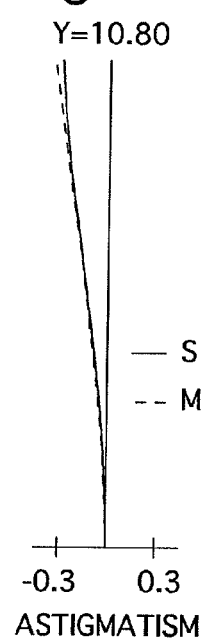
Figure 9D:
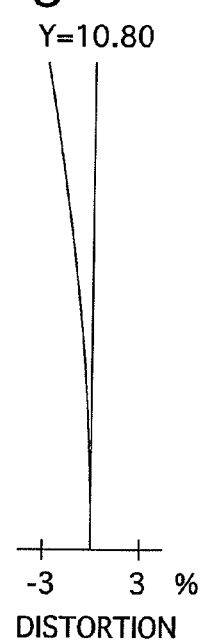

FIG. 4 shows the lens arrangement of the second embodiment of a rear focus wide-angle lens system according to the present invention. FIGS. 5A through 5D show aberrations of the lens arrangement shown in FIG. 4 when an object at infinity is in an in-focus state. FIGS. 6A through 6D show aberrations of the lens arrangement shown in FIG. 4 when an object at the closest distance (0.1 m) is in an in-focus state.

Table 2 shows the numerical data of the second embodiment.

TABLE 2-continued

| D5 =        | 4.999–1.914 |       |         |      |
|-------------|-------------|-------|---------|------|

| Surf. No.     | r       | d     | Nd      | ν    |
|---------------|---------|-------|---------|------|
| 1*            | 73.227  | 1.800 | 1.80466 | 40.7 |
| 2*            | 11.186  | 7.394 |         |      |
| 3             | 22.100  | 5.700 | 1.88300 | 40.8 |
| 4             | −66.502 | 8.991 |         |      |
| 5 (Diaphragm) | ∞       | D5    |         |      |
| 6             | −10.451 | 1.500 | 1.71736 | 29.5 |

TABLE 2-continued

| | | | | |
|---|---|---|---|---|
| 7 | 74.162 | 3.600 | 1.72916 | 54.7 |
| 8 | −15.646 | 0.100 | | |
| 9* | 53.258 | 4.300 | 1.49700 | 81.6 |
| 10* | −15.544 | 0.000 | | |
| 11 | ∞ | 2.450 | 1.51633 | 64.1 |
| 12 | ∞ | — | | |

Aspherical surface data (the aspherical surface coefficients not indicated are zero (0.00)):

| Surf. No. | K | A4 | A6 | A8 |
|---|---|---|---|---|
| 1 | 0.0 | $0.2773 \times 10^{-4}$ | $-0.3440 \times 10^{-6}$ | $0.1196 \times 10^{-8}$ |
| 2 | 0.0 | $-0.1006 \times 10^{-4}$ | $-0.5587 \times 10^{-6}$ | $-0.3946 \times 10^{-8}$ |
| 9 | 0.0 | $-0.3905 \times 10^{-4}$ | $0.6491 \times 10^{-7}$ | |
| 10 | 0.0 | $0.3419 \times 10^{-4}$ | $0.2932 \times 10^{-7}$ | $0.5830 \times 10^{-9}$ |

The symbol * designates the aspherical surface which is rotationally symmetrical with respect to the optical axis.

[Embodiment ]3

FIG. 7 shows the lens arrangement of the third embodiment of a rear focus wide-angle lens system according to the present invention. FIGS. 8A through 8D show aberrations of the lens arrangement shown in FIG. 7 when an object at infinity is in an in-focus state. FIGS. 9A through 9D show aberrations of the lens arrangement shown in FIG. 7 when an object at the closest distance (0.1 m) is in an in-focus state.

Table 3 shows the numerical data of the third embodiment.

The basic lens arrangement of the third embodiment is the same as that of the second embodiment.

TABLE 3

| | ∞ | 0.1 m |
|---|---|---|
| FNO. = | 2.0-2.1 (Fe) | |
| f = | 17.41-16.85 | |
| m = | 0.000--0.157 | |
| W = | 31.9-31.9 | |
| y = | 10.80-10.80 | |
| fB = | 22.49-25.42 | |
| L = | 70.00-70.00 | |
| D5 = | 5.000-2.070 | |

| Surf. No. | r | d | Nd | ν |
|---|---|---|---|---|
| 1* | 64.471 | 1.800 | 1.80466 | 40.7 |
| 2* | 12.459 | 11.144 | | |
| 3 | 24.730 | 5.800 | 1.88300 | 40.8 |
| 4 | −99.212 | 10.614 | | |
| 5 (Diaphragm) | ∞ | D5 | | |
| 6 | −11.347 | 1.500 | 1.71736 | 29.5 |
| 7 | 45.785 | 4.300 | 1.72916 | 54.7 |
| 8 | −15.749 | 0.100 | | |
| 9* | 37.314 | 4.800 | 1.49700 | 81.6 |
| 10* | −22.050 | 0.000 | | |
| 11 | ∞ | 2.450 | 1.51633 | 64.1 |
| 12 | ∞ | — | | |

Aspherical surface data (the aspherical surface coefficients not indicated are zero (0.00)):

| Surf. No. | K | A4 | A6 | A8 |
|---|---|---|---|---|
| 1 | 0.0 | $0.2803 \times 10^{-4}$ | $-0.2121 \times 10^{-6}$ | $0.5315 \times 10^{-9}$ |
| 2 | 0.0 | $0.9743 \times 10^{-6}$ | $-0.1965 \times 10^{-6}$ | $-0.2527 \times 10^{-8}$ |
| 9 | 0.0 | $-0.2318 \times 10^{-4}$ | $0.1332 \times 10^{-7}$ | |
| 10 | 0.0 | $0.2632 \times 10^{-4}$ | $-0.2122 \times 10^{-7}$ | $0.1550 \times 10^{-9}$ |

The symbol * designates the aspherical surface which is rotationally symmetrical with respect to the optical axis.

[Embodiment ]4

Figure 10:
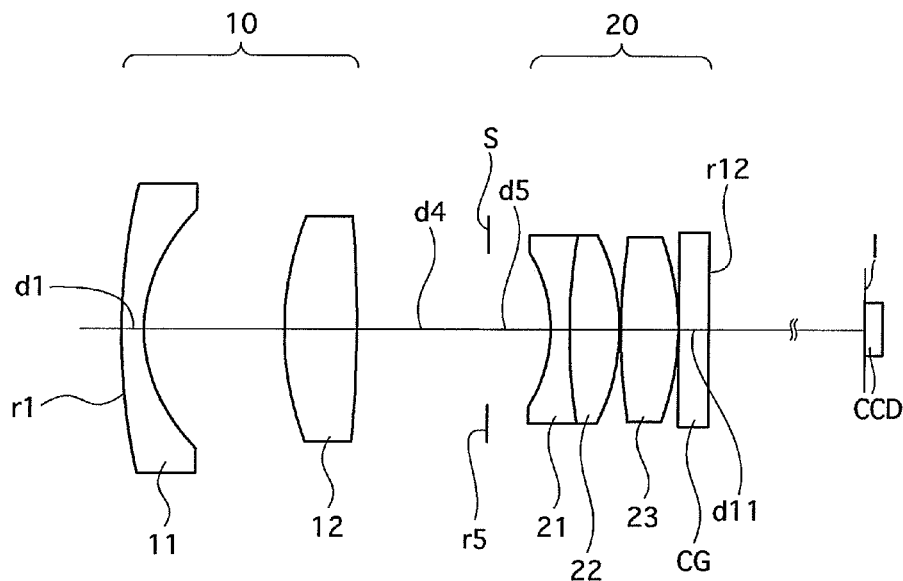
FIG. 10 shows a lens arrangement of a fourth embodiment of a rear focus wide-angle lens system according to the present invention.
Figures 11A, 11B, 11C, 11D:
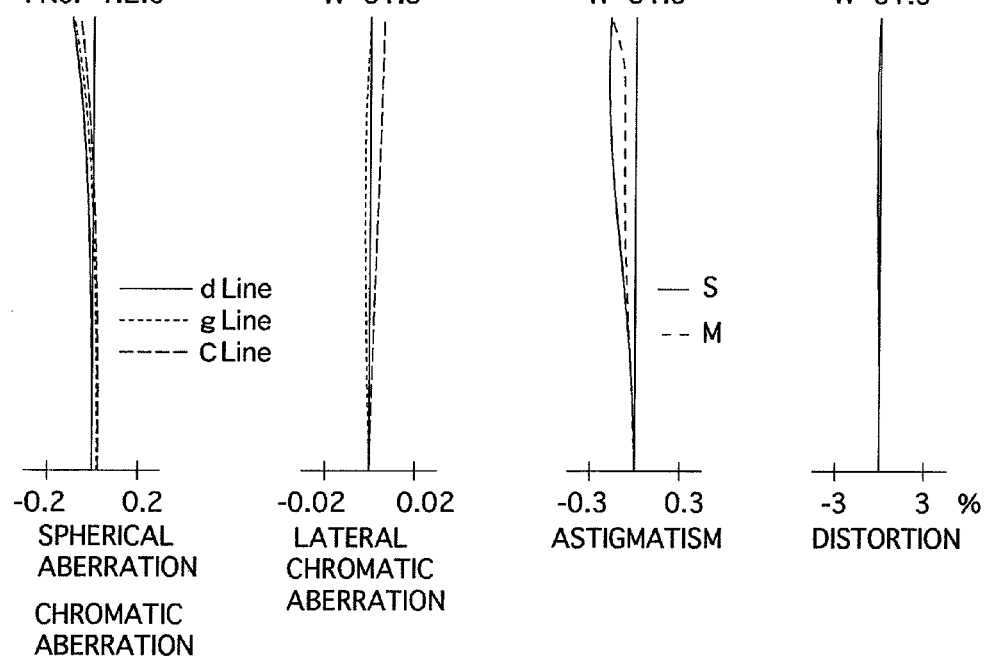
FIGS. 11A, 11B, 11C and 11D show aberrations of the lens arrangement shown in FIG. 10 when an object at infinity is in an in-focus state.

FIG. 10 shows the lens arrangement of the fourth embodiment of a rear focus wide-angle lens system according to the present invention. FIGS. 11A through 11D show aberrations of the lens arrangement shown in FIG. 10 when an object at infinity is in an in-focus state. FIGS. 12A through 12D show aberrations of the lens arrangement shown in FIG. 10 when an object at the closest distance (0.1 m) is in an in-focus state.

Table 4 shows the numerical data of the fourth embodiment.

The basic lens arrangement of the fourth embodiment is the same as that of the second embodiment.

TABLE 4

| | ∞ | 0.1 m |
|---|---|---|
| FNO. = | 2.0-2.2 (Fe) | |
| f = | 17.80-17.21 | |
| m = | 0.000--0.161 | |
| W = | 31.3-30.9 | |
| y = | 10.80-10.80 | |
| fB = | 23.01-26.08 | |
| L = | 70.00-70.00 | |
| D5 = | 4.999-1.926 | |

| Surf. No. | r | d | Nd | ν |
|---|---|---|---|---|
| 1* | 57.055 | 1.800 | 1.80466 | 40.7 |
| 2* | 12.274 | 11.264 | | |
| 3 | 24.829 | 5.800 | 1.88300 | 40.8 |
| 4 | −103.689 | 10.478 | | |
| 5 (Diaphragm) | ∞ | D5 | | |
| 6 | −11.782 | 1.500 | 1.71736 | 29.5 |
| 7 | 46.196 | 4.000 | 1.72916 | 54.7 |
| 8 | −16.723 | 0.100 | | |
| 9* | 41.758 | 4.600 | 1.49700 | 81.6 |
| 10* | −20.012 | 0.000 | | |
| 11 | ∞ | 2.450 | 1.51633 | 64.1 |
| 12 | ∞ | — | | |

Aspherical surface data (the aspherical surface coefficients not indicated are zero (0.00)):

| Surf. No. | K | A4 | A6 | A8 |
|---|---|---|---|---|
| 1 | 0.0 | $0.2682 \times 10^{-4}$ | $-0.2230 \times 10^{-6}$ | $0.6111 \times 10^{-9}$ |
| 2 | 0.0 | $-0.5488 \times 10^{-6}$ | $-0.2531 \times 10^{-6}$ | $-0.2430 \times 10^{-8}$ |
| 9 | 0.0 | $-0.2638 \times 10^{-4}$ | $0.1278 \times 10^{-7}$ | |
| 10 | 0.0 | $0.2645 \times 10^{-4}$ | $-0.1278 \times 10^{-7}$ | $0.1430 \times 10^{-9}$ |

The symbol * designates the aspherical surface which is rotationally symmetrical with respect to the optical axis.

[Embodiment ]5

FIG. 13 shows the lens arrangement of the fifth embodiment of a rear focus wide-angle lens system according to the present invention. FIGS. 14A through 14D show aberrations of the lens arrangement shown in FIG. 13 when an object at infinity is in an in-focus state. FIGS. 15A through 15D show aberrations of the lens arrangement shown in FIG. 13 when an object at the closest distance (0.1 m) is in an in-focus state.

Table 5 shows the numerical data of the fifth embodiment.

The basic lens arrangement of the fifth embodiment is the same as that of the second embodiment.

TABLE 5

|  | 8 | 0.1 m |
|---|---|---|
| FNO. = | 2.8-2.9 (Fe) | |
| f = | 14.21-14.12 | |
| m = | 0.000--0.129 | |
| W = | 37.4-36.6 | |
| y = | 10.80-10.80 | |
| fB = | 21.62-23.48 | |
| L = | 70.00-71.18 | |
| D5 = | 5.000-4.315 | |

| Surf. No. | r | d | Nd | ν |
|---|---|---|---|---|
| 1* | 45.037 | 1.800 | 1.68965 | 52.9 |
| 2* | 10.366 | 16.339 | | |
| 3 | 26.582 | 3.434 | 1.88300 | 40.8 |
| 4 | −213.405 | 9.361 | | |
| 5 (Diaphragm) | ∞ | D5 | | |
| 6 | −15.396 | 1.500 | 1.71736 | 29.5 |
| 7 | 28.284 | 3.400 | 1.72916 | 54.7 |
| 8 | −28.284 | 0.100 | | |
| 9* | 30.297 | 5.000 | 1.49700 | 81.6 |
| 10* | −15.371 | 0.000 | | |
| 11 | ∞ | 2.450 | 1.51633 | 64.1 |
| 12 | ∞ | — | | |

Aspherical surface data (the aspherical surface coefficients not indicated are zero (0.00)):

| Surf. No. | K | A4 | A6 | A8 | A10 |
|---|---|---|---|---|---|
| 1 | 0.0 | $0.2107 \times 10^{-4}$ | $-0.1744 \times 10^{-6}$ | $0.4806 \times 10^{-9}$ | $-0.3894 \times 10^{-12}$ |
| 2 | −0.356 | $0.5540 \times 10^{-5}$ | $-0.1066 \times 10^{-6}$ | $-0.2619 \times 10^{-9}$ | |
| 9 | 0.0 | $-0.5265 \times 10^{-4}$ | $0.1660 \times 10^{-6}$ | $-0.1253 \times 10^{-9}$ | $-0.1523 \times 10^{-10}$ |
| 10 | 0.704 | $0.7380 \times 10^{-4}$ | $0.1867 \times 10^{-6}$ | $0.1317 \times 10^{-8}$ | $-0.3892 \times 10^{-11}$ |

The symbol * designates the aspherical surface which is rotationally symmetrical with respect to the optical axis.

[Embodiment ]6

FIG. 16 shows the lens arrangement of the sixth embodiment of a rear focus wide-angle lens system according to the present invention. FIGS. 17A through 17D show aberrations of the lens arrangement shown in FIG. 16 when an object at infinity is in an in-focus state. FIGS. 18A through 18D show aberrations of the lens arrangement shown in FIG. 16 when an object at the closest distance (0.1 m) is in an in-focus state.

Table 6 shows the numerical data of the sixth embodiment.

The lens arrangement of the sixth embodiment differs from those of the first through fifth embodiments in that the positive first lens group 10 is not constituted by two lens elements, but from three lens elements, i.e., a negative first lens element 11 formed as a negative meniscus lens element having the convex surface facing toward the object, a negative second lens element 12 formed as a meniscus lens element having the convex surface facing toward the object, and a biconvex positive third lens element 13, in this order from the object.

The position of the cover glass CG is the same as that of the first through fifth embodiments.

TABLE 6

|  | 8 | 0.1 m |
|---|---|---|
| FNO. = | 2.8-2.9 (Fe) | |
| f = | 14.23-13.85 | |
| m = | 0.000--0.128 | |
| W = | 37.3-37.5 | |
| y = | 10.80-10.80 | |
| fB = | 19.47-21.48 | |
| L = | 65.00-65.00 | |
| D7 = | 5.001-2.992 | |

TABLE 6-continued

| Surf. No. | r | d | Nd | ν |
|---|---|---|---|---|
| 1* | 120.092 | 2.000 | 1.58313 | 59.4 |
| 2* | 13.545 | 3.669 | | |
| 3* | 32.942 | 1.500 | 1.65295 | 36.8 |
| 4 | 14.729 | 8.200 | | |
| 5 | 22.038 | 5.700 | 1.88300 | 40.8 |
| 6 | −65.192 | 6.381 | | |
| 7 (Diaphragm) | ∞ | D7 | | |
| 8 | −15.029 | 1.500 | 1.71736 | 29.5 |
| 9 | 19.822 | 3.859 | 1.72916 | 54.7 |
| 10 | −30.703 | 0.100 | | |
| 11* | 33.251 | 5.170 | 1.49700 | 81.6 |
| 12* | −13.952 | 0.000 | | |
| 13 | ∞ | 2.450 | 1.51633 | 64.1 |
| 14 | ∞ | — | | |

Aspherical surface data (the aspherical surface coefficients not indicated are zero (0.00)):

| Surf. No. | K | A4 | A6 | A8 |
|---|---|---|---|---|
| 1 | 0.0 | $0.3668 \times 10^{-4}$ | $-0.9182 \times 10^{-7}$ | $0.3717 \times 10^{-9}$ |
| 2 | 0.0 | $-0.4595 \times 10^{-4}$ | $-0.1589 \times 10^{-6}$ | $-0.9646 \times 10^{-10}$ |
| 3 | 0.0 | $-0.6507 \times 10^{-4}$ | | |
| 11 | 0.0 | $-0.7380 \times 10^{-4}$ | $-0.1450 \times 10^{-7}$ | |
| 12 | 0.0 | $0.5820 \times 10^{-4}$ | $-0.6426 \times 10^{-7}$ | $0.4789 \times 10^{-9}$ |

The symbol * designates the aspherical surface which is rotationally symmetrical with respect to the optical axis.

The numerical values of each condition for each embodiment are shown in Table 7.

TABLE 7

|  | Embod. 1 | Embod. 2 | Embod. 3 | Embod. 4 |
|---|---|---|---|---|
| Cond. (1) | 2.520 | 2.297 | 1.983 | 1.949 |
| Cond. (2) | 0.510 | 0.638 | 0.571 | 0.541 |
| Cond. (3) | −1.374 | −1.165 | −1.176 | −1.171 |
| Cond. (4) | −0.753 | −0.445 | −0.572 | −0.569 |
| Cond. (5) | 1.6935 | 1.80466 | 1.80466 | 1.80466 |
| Cond. (6) | 81.6 | 81.6 | 81.6 | 81.6 |

|  | Embod. 5 | Embod. 6 |
|---|---|---|
| Cond. (1) | 2.221 | 1.588 |
| Cond. (2) | 0.464 | 0.504 |
| Cond. (3) | −1.351 | — |
| Cond. (4) | −0.819 | — |
| Cond. (5) | 1.68965 | 1.58313 |
| Cond. (6) | 81.6 | 81.6 |

As can be understood from Table 7, the first through fifth embodiments in which the first lens group 10 is constructed from a negative lens element and a positive lens element, in this order from the object, satisfy conditions (1) through (6), and the sixth embodiment in which the first lens group 10 is constructed from two negative lens elements and one positive lens element, in this order from the object, satisfy conditions (1) through (6) except conditions (3) and (4). Furthermore, as can be understood from the aberration diagrams, the various aberrations are suitably corrected, especially the various aberrations that occur when focusing on an object at a minimum distance.

According to the present invention, a rear focus wide-angle lens system which can attain at least the following features is provided:

a half angle-of-view exceeding 30°;

superior optical quality when focusing is carried out for an object at closer distance;

high resolution; and

Light-weight focusing lens group.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A rear focus wide-angle lens system comprises a first lens group, a diaphragm, and a second lens group, in this order from an object, wherein said second lens group is moved along the optical axis thereof toward the object when focusing is performed from infinity to an object at a closer distance without movement of the first lens group along the optical axis during focusing; and wherein said rear focus wide-angle lens system satisfies the following conditions:

$1.5 < F1/F2 < 3.0$ and $0.35 < D2/D1 < 0.7$ wherein

F1 designates the focal length of said first lens group;

F2 designates the focal length of said second lens group;

D1 designates the distance along the optical axis from the most object-side surface of said first lens group to the most image-side surface thereof; and D2 designates the distance along the optical axis from the most object-side surface of said second lens group to the most image-side surface thereof.

2. An electronic imaging device comprising said rear focus wide-angle lens system according to claim 1.

3. The rear focus wide angle lens system according to claim 1, wherein the lens system has a half angle-of-view exceeding 30°.

4. The rear focus wide angle lens system according to claim 1, further comprising a cover glass that is stationary with respect to an imaging plane.

5. A rear focus wide-angle lens system comprises a first lens group, a diaphragm, and a second lens group, in this order from an object, said first lens group comprises a negative first lens element and a positive second lens element, in this order from the object, and wherein said second lens group is moved along the optical axis thereof toward the object when focusing is performed from infinity to an object at a closer distance without movement of the first lens group along the optical axis during focusing; and wherein said rear focus wide-angle lens system satisfies the following condition:

$1.5 < F1/F2 < 3.0$ wherein

F1 designates the focal length of said first lens group; and

F2 designates the focal length of said second lens group; and wherein said first lens group satisfies the following condition:

$-1.5 < f2/f1 < -1.1$ wherein f1 designates the focal length of said negative first lens element; and f2 designates the focal length of said positive second lens element.

6. The rear focus wide-angle lens system according to claim 5, satisfying the following condition:

$N1 > 1.65$ wherein

N1 designates the refractive index of the d-line of the most object-side lens element in said first lens group.

7. The rear focus wide-angle lens system according to claim 5, wherein said negative first lens element comprises a meniscus lens element having the convex surface facing toward the object;

wherein at least the image-side surface of said meniscus lens element comprises an aspherical surface on which the refractive power becomes weaker toward the periphery of the meniscus lens element, compared to the refractive power of the paraxial spherical surface; and wherein said positive second lens element comprises a biconvex positive lens element.

8. An electronic imaging device comprising said rear focus wide-angle lens system according to claim 5.

9. The rear focus wide angle lens system according to claim 5, wherein the lens system has a half angle-of-view exceeding 30°.

10. A rear focus wide-angle lens system comprises a first lens group, a diaphragm, and a second lens group, in this order from an object, said first lens group comprises a negative first lens element and a positive second lens element, in this order from the object, and wherein said second lens group is moved along the optical axis thereof toward the object when focusing is performed from infinity to an object at a closer distance without movement of the first lens group along the optical axis during focusing; and wherein said rear focus wide-angle lens system satisfies the following condition:

$$1.5 < F1/F2 < 3.0$$

wherein

F1 designates the focal length of said first lens group; and
F2 designates the focal length of said second lens group; and wherein said first lens group satisfies the following condition:

$$-1.5 < d1/f1 < -0.4$$

wherein d1 designates the distance along the optical axis from the image-side surface of said negative first lens element to the object-side surface of said positive second lens element; and f1 designates the focal length of said negative first lens element.

11. An electronic imaging device comprising said rear focus wide-angle lens system according to claim 10.

12. The rear focus wide angle lens system according to claim 10, wherein the lens system has a half angle-of-view exceeding 30°.

13. A rear focus wide-angle lens system comprises a first lens group, a diaphragm, and a second lens group, in this order from an object, wherein said second lens group is moved along the optical axis thereof toward the object when focusing is performed from infinity to an object at a closer distance without movement of the first lens group along the optical axis during focusing; and wherein said rear focus wide-angle lens system satisfies the following conditions:

$$1.5 < F1/F2 < 3.0 \text{ and}$$

$$\nu L > 70$$

wherein

F1 designates the focal length of said first lens group;
F2 designates the focal length of said second lens group, and
νL designates the Abbe number of the d-line of the most image-side lens element of the rear focus wide-angle lens system.

14. An electronic imaging device comprising said rear focus wide-angle lens system according to claim 13.

15. The rear focus wide angle lens system according to claim 13, wherein the lens system has a half angle-of-view exceeding 30°.

16. A rear focus wide-angle lens system comprises a first lens group, a diaphragm, and a second lens group, in this order from an object, said first lens group comprises a negative first lens element comprising a negative meniscus lens element having a convex surface facing the object and a positive second lens element comprising a biconvex positive lens element, in this order from the object;

at least an image side surface of said negative meniscus lens element comprises an aspherical surface on which the refractive power becomes weaker towards the periphery of the meniscus lens element, compared to the refractive power of the paraxial spherical surface;

said second lens group comprises a cemented lens comprising a biconcave negative third lens element and a biconvex positive fourth lens element, and a biconvex positive fifth lens element, in this order from the object; and both surfaces of said biconvex positive fifth lens element comprise aspherical surfaces on which the refractive power becomes weaker towards the periphery of said biconvex positive fifth lens element, compared to the refractive power of the paraxial spherical surface wherein said second lens group is moved along the optical axis thereof toward the object when focusing is performed from infinity to an object at a closer distance without movement of the first lens group along the optical axis during focusing; and wherein said rear focus wide-angle lens system satisfies the following conditions:

$$1.5 < F1/F2 < 3.0$$

wherein

F1 designates the focal length of said first lens group; and
F2 designates the focal length of said second lens group.

17. A rear focus wide-angle lens system comprises a first lens group, a diaphragm and a second lens group, in this order from an object, wherein said first lens group comprises a negative first lens element that comprises a meniscus lens element having a convex surface facing towards the object a negative second lens element that comprises a meniscus lens element having a convex surface facing towards the object and a biconvex positive thirds lens element, in this order from the object, and said second lens group is moved along the optical axis thereof toward the object when focusing is performed from infinity to an object at a closer distance without movement of the first lens group along the optical axis during focusing; and wherein said rear focus wide-angle lens system satisfies the following condition:

$$1.5 < F1/F2 < 3.0$$

wherein

F1 designates the focal length of said first lens group; and
F2 designates the focal length of said second lens group.

18. An electronic imaging device comprising said rear focus wide-angle lens system according to claim 17.

19. The rear focus wide angle lens system according to claim 17, wherein the lens system has a half angle-of-view exceeding 30°.

20. A rear focus wide-angle lens system comprises a first lens group, a diaphragm and a second lens group, in this order from an object, and a cover glass that is movable, together with said second lens group, along the optical axis when focusing is performed, wherein said second lens group is moved along the optical axis thereof toward the object when focusing is performed from infinity to an object at a closer distance without movement of the first lens group along the optical axis during focusing; and wherein said rear focus wide-angle lens system satisfies the following condition:

$$1.5 < F1/F2 < 3.0$$

wherein

F1 designates the focal length of said first lens group; and
F2 designates the focal length of said second lens group.

* * * * *